(12) United States Patent
Hasegawa et al.

(10) Patent No.: US 11,043,126 B2
(45) Date of Patent: Jun. 22, 2021

(54) VEHICLE, VEHICLE CONTROL METHOD, AND VEHICLE CONTROL PROGRAM

(71) Applicant: TOYOTA JIDOSHA KABUSHIKI KAISHA, Toyota (JP)

(72) Inventors: Hideo Hasegawa, Nagoya (JP); Keiko Kameda, Toyota (JP); Misa Ejiri, Nagoya (JP); Shintaro Naruse, Nisshin (JP); Tadahiro Kashiwai, Nagoya (JP); Naoya Oka, Toyota (JP); Kensuke Koike, Nisshin (JP); Hiroyuki Monji, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 19 days.

(21) Appl. No.: 16/701,208

(22) Filed: Dec. 3, 2019

(65) Prior Publication Data

US 2020/0234591 A1   Jul. 23, 2020

(30) Foreign Application Priority Data

Jan. 18, 2019 (JP) .............................. JP2019-007168

(51) Int. Cl.
| | |
|---|---|
| *G08G 1/16* | (2006.01) |
| *G06K 9/00* | (2006.01) |
| *G06K 9/52* | (2006.01) |
| *B60R 11/04* | (2006.01) |

(52) U.S. Cl.
CPC ......... *G08G 1/163* (2013.01); *G06K 9/00671* (2013.01); *G06K 9/00798* (2013.01); *G06K 9/52* (2013.01); *G08G 1/165* (2013.01); *B60R 11/04* (2013.01)

(58) Field of Classification Search
CPC ........................................................ G08G 1/16
See application file for complete search history.

(56) References Cited

U.S. PATENT DOCUMENTS

| | | | | |
|---|---|---|---|---|
| 2008/0316010 | A1* | 12/2008 | Chang ................... | B60Q 9/008 340/439 |
| 2020/0086876 | A1* | 3/2020 | Yasunori ........... | B60W 30/0956 |

FOREIGN PATENT DOCUMENTS

| | | | |
|---|---|---|---|
| JP | 2012-192843 A | 10/2012 | |
| JP | 2017-142579 A | 8/2017 | |
| JP | 2017142579 A | * 8/2017 | ............. B60R 21/00 |

\* cited by examiner

*Primary Examiner* — Jerry T Jean Baptiste
(74) *Attorney, Agent, or Firm* — Oblon, McClelland, Maier & Neustadt, L.L.P.

(57) ABSTRACT

A vehicle includes a communication unit, a storage unit, a control unit, and an image capturing unit. The vehicle is configured to be communicable with a different vehicle via the communication unit. The control unit is configured to acquire a captured image from the image capturing unit and store the captured image in the storage unit. The control unit is configured to receive, from the different vehicle that is an oncoming vehicle, a determined result as to whether the different vehicle is able to pass. The control unit is configured to determine whether the vehicle is able to pass based on a width of the vehicle and an available road width ahead, determined from the captured image.

9 Claims, 10 Drawing Sheets

FIG. 5

| VEHICLE WIDTH | AVAILABLE ROAD WIDTH | PASSABLE ? |
|---|---|---|
| 2m | 2. 5m | Y |

VEHICLE, VEHICLE CONTROL METHOD, AND VEHICLE CONTROL PROGRAM

INCORPORATION BY REFERENCE

The disclosure of Japanese Patent Application No. 2019-007168 filed on Jan. 18, 2019 including the specification, drawings and abstract is incorporated herein by reference in its entirety.

BACKGROUND

1. Technical Field

The disclosure relates to a vehicle, a vehicle control method, and a vehicle control program.

2. Description of Related Art

There is known a vehicle that, when the vehicle detects a narrow road ahead in the direction of travel of the host vehicle based on an image captured by an in-vehicle camera, the vehicle determines whether the host vehicle can pass through the narrow road based on the width of the host vehicle (for example, Japanese Unexamined Patent Application Publication No. 2012-192843 (JP 2012-192843 A)). When the vehicle determines that the host vehicle can pass through the narrow road, the vehicle displays right and left guide lines to guide the host vehicle on a monitor.

SUMMARY

In JP 2012-192843 A, even when the right and left guide lines are shown on the monitor of the host vehicle, it is not clear whether an oncoming vehicle passes first or waits, so a mentality, such as drivers' giving way to each other, works. This may lead to increased road traffic.

The disclosure provides a vehicle, vehicle control method, and vehicle control program that are able to provide smooth road traffic.

An aspect of the disclosure relates to a vehicle. The vehicle includes a communication unit, a storage unit, a control unit, and an image capturing unit. The vehicle is configured to be communicable with a different vehicle via the communication unit. The control unit is configured to acquire a captured image from the image capturing unit and store the captured image in the storage unit. The control unit is configured to receive, from the different vehicle that is an oncoming vehicle, a determined result as to whether the different vehicle is able to pass. The control unit is configured to determine whether the vehicle is able to pass based on a width of the vehicle and an available road width ahead, determined from the captured image.

Another aspect of the disclosure relates to a vehicle control method for a vehicle including a communication unit, a storage unit, a control unit, and an image capturing unit and configured to be communicable with a different vehicle via the communication unit. The vehicle control method includes a step of acquiring a captured image from the image capturing unit and storing the captured image in the storage unit; and a step of receiving, from the different vehicle that is an oncoming vehicle, a determined result as to whether the different vehicle is able to pass and determining whether the vehicle is able to pass based on a width of the vehicle and an available road width ahead, determined from the captured image.

Further another aspect of the disclosure relates to a vehicle control program for causing a vehicle, including a communication unit, a storage unit, a control unit, and an image capturing unit and configured to be communicable with a different vehicle via the communication unit, to execute a step of acquiring a captured image from the image capturing unit and storing the captured image in the storage unit; and a step of receiving, from the different vehicle that is an oncoming vehicle, a determined result as to whether the different vehicle is able to pass and determining whether the vehicle is able to pass based on a width of the vehicle and an available road width ahead, determined from the captured image.

With the vehicle, vehicle control method, and vehicle control program according to the disclosure, smooth road traffic can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is an example of data stored in a storage unit;

DETAILED DESCRIPTION OF EMBODIMENTS

Hereinafter, an embodiment of the disclosure will be described with reference to the accompanying drawings.

Figure 1:
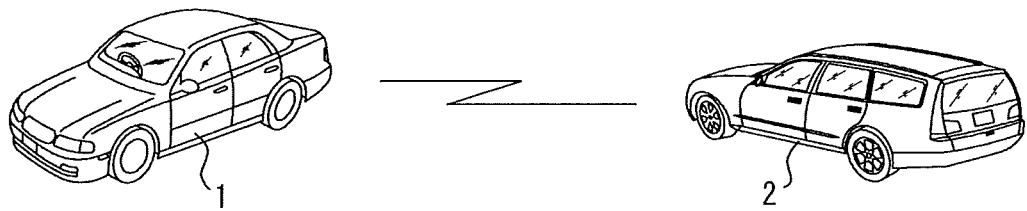
FIG. 1 is an overall view of an information processing system of an embodiment.

FIG. 1 is an overall view of an information processing system of the present embodiment. The information processing system includes a first vehicle 1 and a second vehicle 2. The first vehicle 1 and the second vehicle 2 of the present embodiment each are, for example, an automobile; however, the first vehicle 1 and the second vehicle 2 each are not limited thereto and may be any vehicle. In FIG. 1, for the sake of simple illustration, one of each of the first vehicle 1 and the second vehicle 2 is shown. However, the number of the first vehicles 1 and the number of the second vehicles 2 each may be more than one. The first vehicle 1 and the second vehicle 2 are configured to be communicable with each other.

First, the outline of a process that the information processing system of the present embodiment executes will be described. In the present embodiment, as an example, the first vehicle 1 travels on a road without a center line that separates a lane for a host vehicle and a lane for an oncoming vehicle from each other. The first vehicle 1 captures a forward image while traveling. When the first vehicle 1 determines that the first vehicle 1 and the second vehicle 2 are coming in opposite directions, the first vehicle 1 determines an available road width ahead from a captured image. The first vehicle 1 acquires the width of the first vehicle 1 from the storage unit 13 and compares the width with the determined road width. As a result of the comparison, the first vehicle 1 determines whether the first vehicle 1 is able to pass and sends a determined result to the second vehicle 2. The second vehicle 2 that has received the determined result determines with a similar method by using a captured image whether the second vehicle 2 is able to pass.

According to the present embodiment, both the vehicles capture an image and determine whether to pass. The second vehicle 2 is able to accurately determine the situations of both vehicles from the determined results in both vehicles and determine, for example, which vehicle moves in what way. For this reason, the first vehicle 1 and the second vehicle 2 are able to reduce the situation in which a mentality, such as drivers' giving way to each other, works on the drivers to cause a time loss and the situation in which drivers drive vehicles in such a mentality to cause accidental contact. Therefore, the first vehicle 1 and the second vehicle 2 are able to provide smooth road traffic.

Figure 2A:
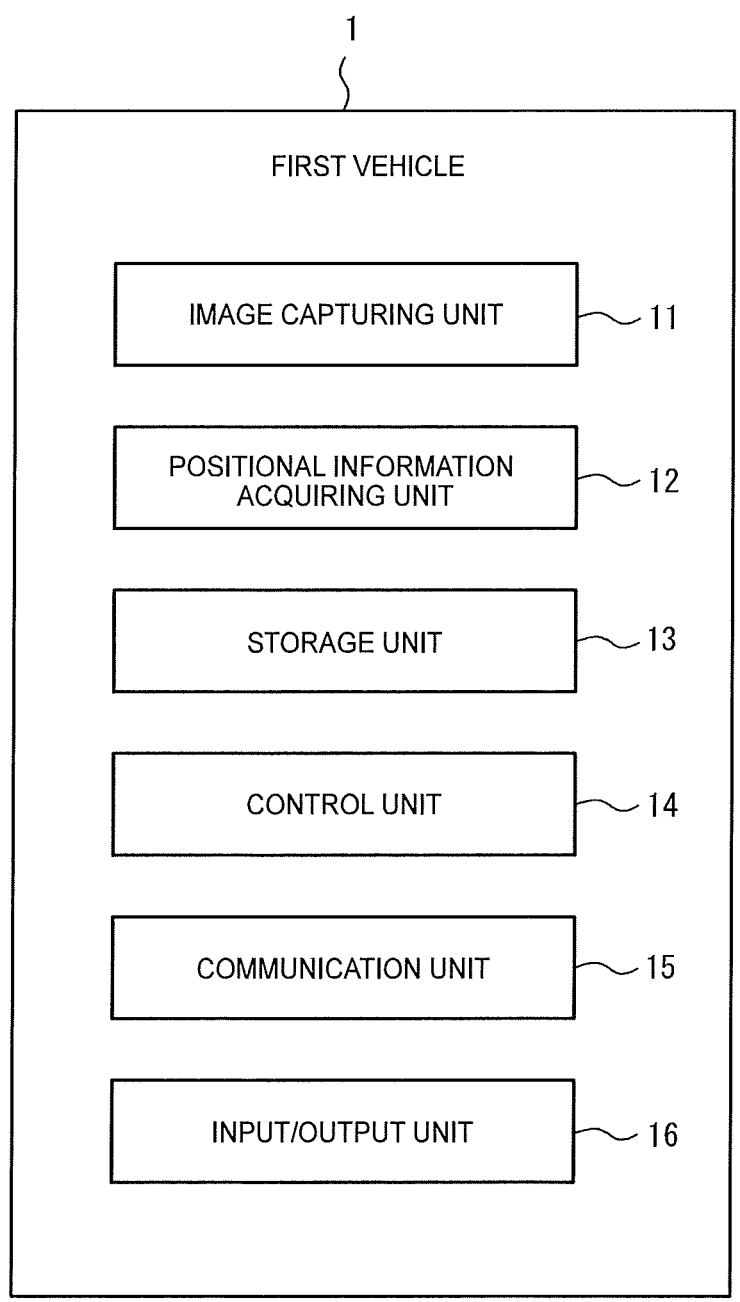
FIG. 2A is a functional block diagram of a first vehicle of the embodiment.

As shown in FIG. 2A, the first vehicle 1 includes an image capturing unit 11, a positional information acquiring unit 12, a storage unit 13, a control unit 14, a communication unit 15, and an input/output unit 16.

The image capturing unit 11 includes a so-called in-vehicle camera, and captures an image outside (in the present embodiment, ahead of) the first vehicle 1. The image capturing unit 11 may generate sequential images outside the first vehicle 1 while the first vehicle 1 is traveling or stopped and record the generated images in the storage unit 13. Alternatively, a selected communication terminal, such as a smartphone, may function as the image capturing unit 11.

The positional information acquiring unit 12 includes one or more receivers that support a selected satellite positioning system. For example, the positional information acquiring unit 12 may include a global positioning system (GPS). The positional information acquiring unit 12 detects positional information that indicates a position at which the first vehicle 1 is stopped or traveling. The positional information acquiring unit 12 may further include an electromagnetic compass and may acquire information about a direction in which the first vehicle 1 is oriented.

The storage unit 13 is a device that records or stores various pieces of information and includes one or more memories. Examples of the "memory" include a semiconductor memory, a magnetic memory, and an optical memory; however, the memory is not limited thereto. Each memory included in the storage unit 13 may function as, for example, a main storage device, an auxiliary storage device, or a cache memory. The storage unit 13 may store information about a result analyzed or processed by the control unit 14. The storage unit 13 may store a vehicle control program for the host vehicle, various pieces of information regarding the operation or control over the first vehicle 1 (for example, the width and margin value of the first vehicle 1), and other information.

The control unit 14 includes one or more processors. The processor may be a general purpose processor or a special purpose processor specialized in a specific process. For example, an electronic control unit (ECU) mounted on the first vehicle 1 may function as the control unit 14. The control unit 14 controls the overall operations of the first vehicle 1. The control unit 14 executes control over other functional units included in the first vehicle 1 and executes all the control related to travel or operations of the first vehicle 1. For example, the control unit 14 is able to acquire an image from the image capturing unit 11 and analyze the image. A selected image analysis technique, such as machine learning, may be employed as image analysis.

The communication unit 15 includes a communication module that performs vehicle-to-vehicle communication in a predetermined frequency band between the first vehicle 1 and the second vehicle 2. For example, a data communication module (DCM), or the like, mounted on the first vehicle 1 may function as the communication unit 15.

The input/output unit 16 includes an input interface that detects user input and sends input information to the control unit 14. Examples of the input interface include a physical key, a capacitance key, a touch screen integrated with a display panel, and a microphone that receives voice input; however, the input interface is not limited thereto and may be a selected input unit. The input/output unit 16 includes an output interface that outputs, to a user, information generated by the control unit 14 or information read from the storage unit 13. Examples of the output interface include a display panel that outputs information by image, a head-up display that also outputs information by image, and a speaker that outputs information by voice; however, the output interface is not limited thereto and may be a selected output unit. The input/output unit 16 is able to provide information acquired via the communication unit 15 to a driver by voice, screen display, or the like.

Figure 2B:
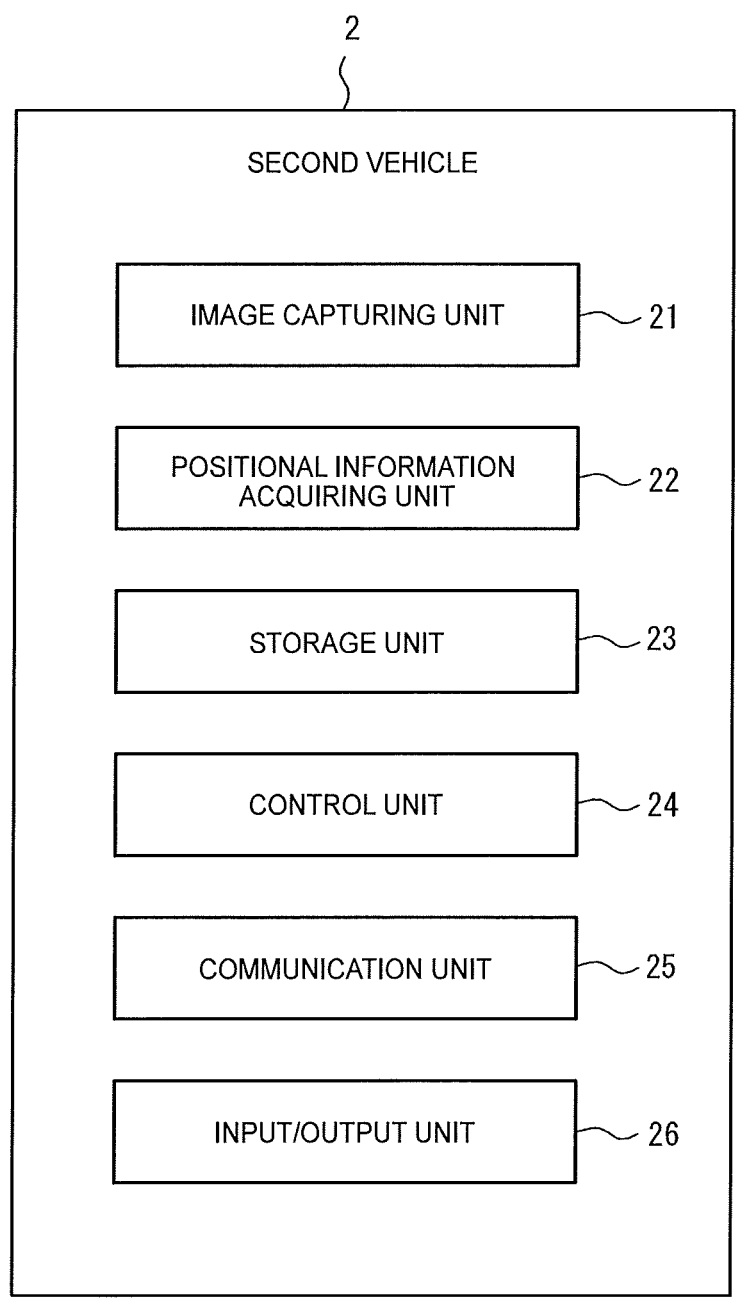
FIG. 2B is a functional block diagram of a second vehicle of the embodiment.

As shown in FIG. 2B, the second vehicle 2 includes an image capturing unit 21, a positional information acquiring unit 22, a storage unit 23, a control unit 24, a communication unit 25, and an input/output unit 26. The hardware configuration of each of the image capturing unit 21, the positional information acquiring unit 22, the storage unit 23, the control unit 24, the communication unit 25, and the input/output unit 26 is the same as the hardware configuration of the image capturing unit 11, the positional information acquiring unit 12, the storage unit 13, the control unit 14, the communication unit 15, and the input/output unit 16. Therefore, the description thereof will not be repeated.

Hereinafter, a vehicle control method that is executed in the vehicle of the present embodiment will be described in detail. The vehicle of the present embodiment determines whether the vehicle and a different vehicle are coming in opposite directions and sends a determined result to the different vehicle at predetermined time intervals while the vehicle is traveling or stopped. In the present embodiment, for the sake of convenience of description, the vehicle that sends a determined result first is referred to as the first vehicle 1 and the vehicle that receives the determined result is referred to as the second vehicle 2.

Figure 3:
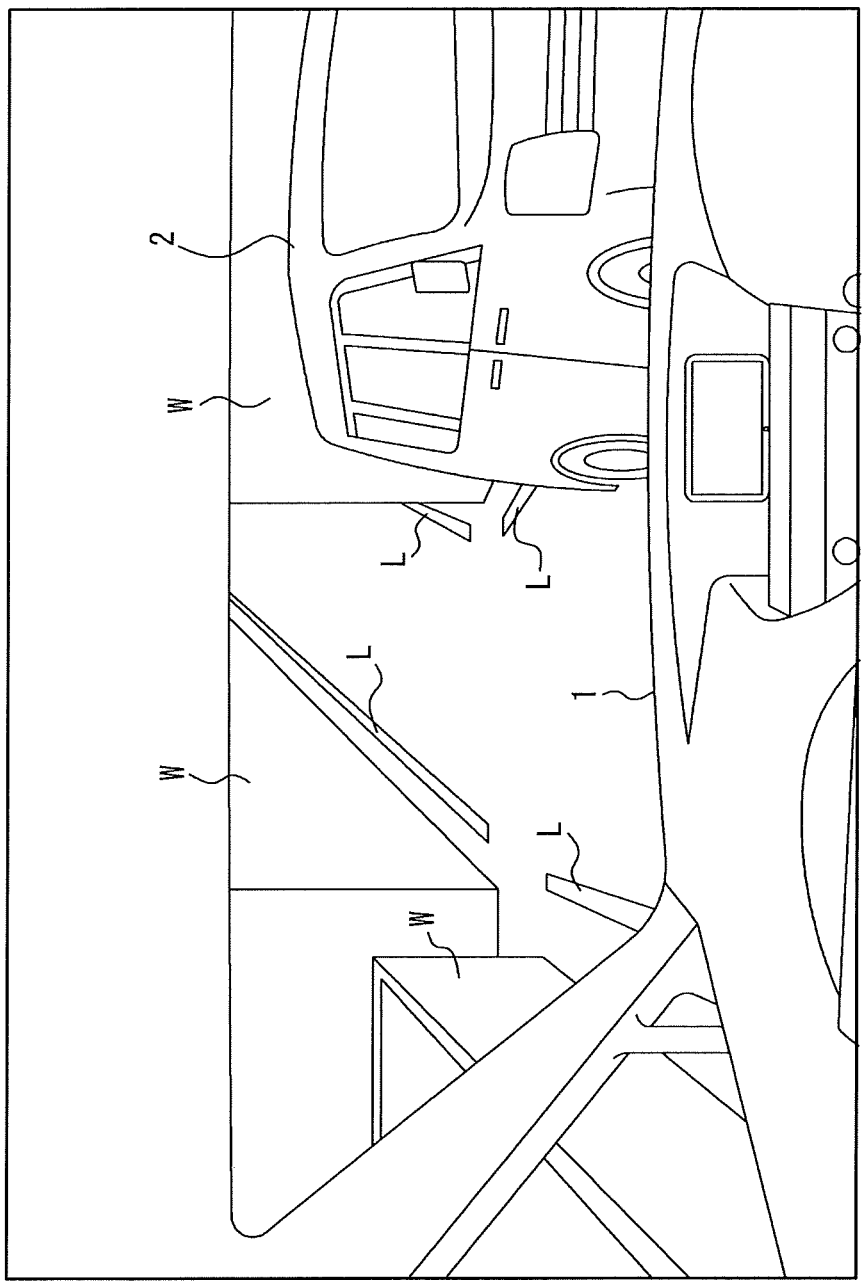
FIG. 3 is an example of an image captured by the first vehicle.

The above process in which the first vehicle 1 determines whether the first vehicle 1 and the second vehicle 2 are coming in opposite directions will be specifically described. The first vehicle 1 captures an image ahead of the first vehicle 1 with the image capturing unit 11 and analyzes the image. The first vehicle 1 analyzes an image as shown in, for example, FIG. 3 and detects that the first vehicle 1 and the second vehicle 2 are coming in opposite directions. Additionally, the first vehicle 1 detects white lines L and walls W from the image shown in FIG. 3.

Figure 4:
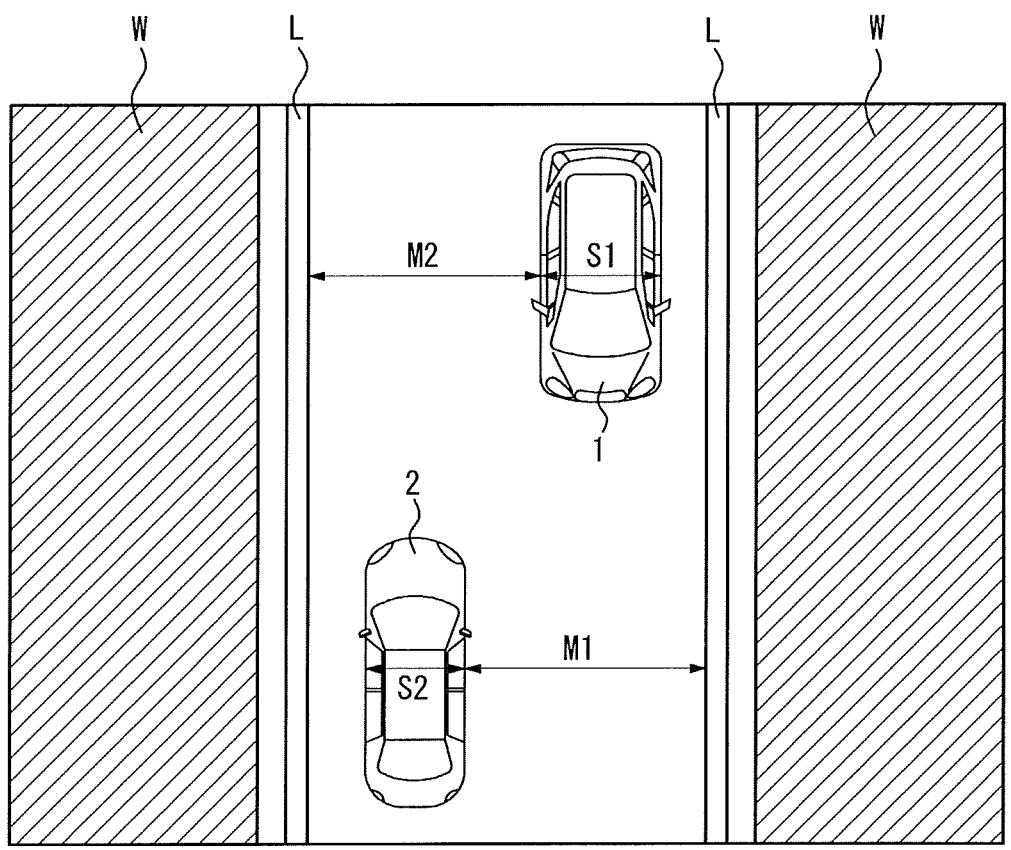
FIG. 4 is a bird's eye view of a first scene where the first vehicle and the second vehicle are coming in opposite directions.

FIG. 4 is a bird's eye view of a scene where the first vehicle 1 and the second vehicle 2 are coming in opposite directions. As described above, the first vehicle 1 detects the second vehicle 2, white lines L, and walls W from the captured image. Additionally, the first vehicle 1 is able to detect a guard rail, a curb, or the like. The first vehicle 1 determines an available road width M1 ahead of the first vehicle 1 by using information detected from the captured image.

The first vehicle 1 acquires the width S1 of the first vehicle 1 from the storage unit 13. For example, the width S1 may be a width between the outer sides of two side mirrors of the first vehicle 1. The first vehicle 1 compares a value obtained by adding a margin to the width S1 with the road width M1.

When the former value is less than or equal to the latter value, that is, when the following inequality holds, the first vehicle 1 determines that the first vehicle 1 is able to pass.

Width $S1$+Margin≤Road Width $M1$

In the present embodiment, the width S1 is 2 m, the margin is 30 cm, and the road width M1 is 2.5 m. Since 2 m+30 cm≤2.5 m, the first vehicle 1 at this time determines that the first vehicle 1 is able to pass. As shown in FIG. 5, the first vehicle 1 stores "Y" indicating that the first vehicle 1 is able to pass in the cell "Passable?" in the storage unit 13.

On the other hand, when the former value exceeds the latter value, that is, when the following inequality holds, the first vehicle 1 determines that the first vehicle 1 is not able to pass. Width S1+Margin>Road Width M1

The first vehicle 1 sends a determined result, indicating that the first vehicle 1 is able to pass or not able to pass, to the second vehicle 2. The second vehicle 2 determines whether the first vehicle 1 is able to pass or not able to pass by referring to the received determined result.

The second vehicle 2 determines whether the second vehicle 2 is able to pass. Specifically, the second vehicle 2 detects the first vehicle 1, white lines L, and walls W from the image captured with the image capturing unit 21, and determines an available road width M2 ahead of the second vehicle 2 by using the detected information. The second vehicle 2 acquires the width S2 of the second vehicle 2 from the storage unit 23. The second vehicle 2 determines whether the second vehicle 2 is able to pass by comparing a value obtained by adding a margin to the width S2 with the road width M2. A determining method is the same as the determining method that the first vehicle 1 uses, so the detailed description thereof will not be repeated. Hereinafter, a process that the second vehicle 2 executes when the first vehicle 1 is not able to pass and a process that the second vehicle 2 executes when the first vehicle 1 is able to pass will be described separately.

When First Vehicle 1 is not Able to Pass

When the first vehicle 1 is not able to pass, and when the second vehicle 2 determines that the second vehicle 2 is able to pass, the second vehicle 2 prompts a driver of the second vehicle 2 to pass by voice, screen display, or the like, via the input/output unit 26. The second vehicle 2 prompts a driver of the first vehicle 1 to wait until the second vehicle 2 passes by. Specifically, the second vehicle 2 sends, to the first vehicle 1 via the communication unit 25, a notification prompting the first vehicle 1 to wait until the second vehicle 2 passes by. The input/output unit 16 of the first vehicle 1 outputs the notification to the driver of the first vehicle 1 by voice, screen display, or the like.

Figure 6:
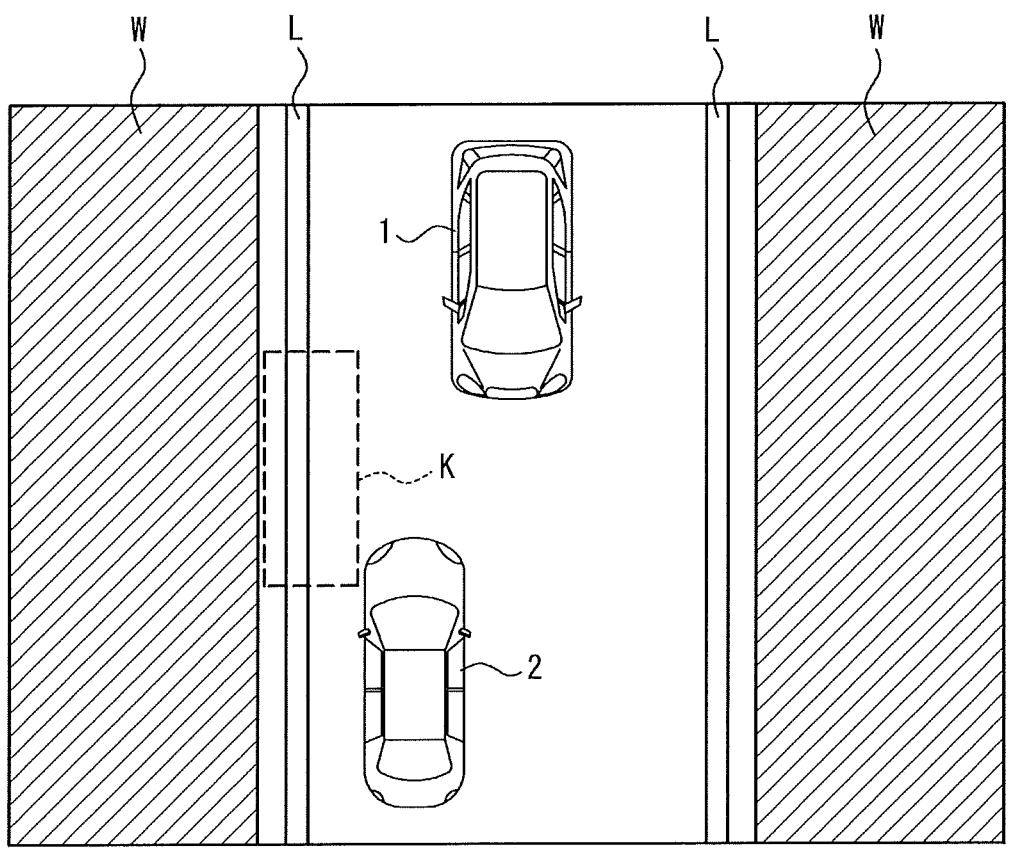
FIG. 6 is a bird's eye view of a second scene where the first vehicle and the second vehicle are coming in opposite directions.

When the first vehicle 1 is not able to pass, and when the second vehicle 2 determines that the second vehicle 2 is not able to pass, the second vehicle 2 determines from the captured image whether there is a passing space to the side of the second vehicle 2 and between the first vehicle 1 and the second vehicle 2. A passing space includes at least one of a sidewalk and a turnout for vehicles. In the present embodiment, the second vehicle 2 determines that there is a passing space K shown in FIG. 6. The second vehicle 2 prompts the driver of the second vehicle 2 via the input/output unit 26 to move the second vehicle 2 to the passing space K. The second vehicle 2 prompts the driver of the first vehicle 1 to pass after the second vehicle 2 has been moved to the passing space K.

When the second vehicle 2 determines that there is no passing space to the side of the second vehicle 2, the second vehicle 2 determines from the captured image whether there is a back-up space behind the first vehicle 1. When the second vehicle 2 determines that there is a back-up space behind the first vehicle 1, the second vehicle 2 prompts the driver of the first vehicle 1 to back up until a road width that the second vehicle 2 is able to pass is ensured.

When the second vehicle 2 determines that there is no back-up space because of, for example, the fact that a following vehicle is waiting behind the first vehicle 1, the second vehicle 2 may determine whether there is a back-up space behind the second vehicle 2 with the image capturing unit 21 that captures an image behind the second vehicle 2. When the second vehicle 2 determines that there is a back-up space behind the second vehicle 2, the second vehicle 2 prompts the driver via the input/output unit 26 to back up until a road width that the first vehicle 1 is able to pass is ensured. When the second vehicle 2 determines that there is no back-up space behind the second vehicle 2, the second vehicle 2 may inform the determined details to the driver of the second vehicle 2.

When First Vehicle 1 is Able to Pass

When the first vehicle 1 is able to pass, and when the second vehicle 2 determines that the second vehicle 2 is not able to pass, the second vehicle 2 prompts the driver of the first vehicle 1 to pass. The second vehicle 2 prompts the driver via the input/output unit 26 to wait until the first vehicle 1 passes by.

When the first vehicle 1 is not able to pass, and when the second vehicle 2 determines that the second vehicle 2 is able to pass, the second vehicle 2 detects environmental information around the first vehicle 1 and the second vehicle 2 from the captured image and determines which vehicle passes first based on the environmental information. In this determination, the second vehicle 2 may acquire a captured image from the first vehicle 1 and detect environmental information from the captured image. Environmental information is, for example, information that indicates whether there is a cliff or gutter on at least any one of the sides of a road. When the second vehicle 2 determines that there is a cliff or a gutter, the second vehicle 2 may determine that the vehicle that travels on a side where there is no cliff or gutter passes first. The second vehicle 2 informs the determined details to the driver of the first vehicle 1 and the driver of the second vehicle 2.

In another embodiment, when both the first vehicle 1 and the second vehicle 2 are able to pass, the second vehicle 2 may determine from the captured image whether there is an obstacle ahead of the first vehicle 1 or the second vehicle 2 and may determine that the vehicle in front of which there is no obstacle passes first. The second vehicle 2 informs the determined details to the driver of the first vehicle 1 and the driver of the second vehicle 2.

In another embodiment, when both the first vehicle 1 and the second vehicle 2 are able to pass, the second vehicle 2 may determine whether a beginner driver sign is stuck to a body of any one of the first vehicle 1 and the second vehicle 2 and determine which vehicle passes first according to the determined details. For example, the second vehicle 2 determines that the vehicle to which a beginner driver sign is stuck passes first from the viewpoint of beginner priority and informs the determined result to the driver of the first vehicle 1 and the driver of the second vehicle 2. Alternatively, the second vehicle 2 may determine that the vehicle to which no beginner driver sign is stuck passes first from the viewpoint of reduction of accidental contact and inform the determined result to the drivers. Additionally or alternatively, when the second vehicle 2 determines with an acceleration sensor that the first vehicle 1 or the second vehicle 2 is traveling on a hill, the second vehicle 2 determines that the vehicle climbing the hill passes first. The second vehicle 2 informs the determined details to the driver of the first vehicle 1 and the driver of the second vehicle 2.

Flowcharts

Figure 7:
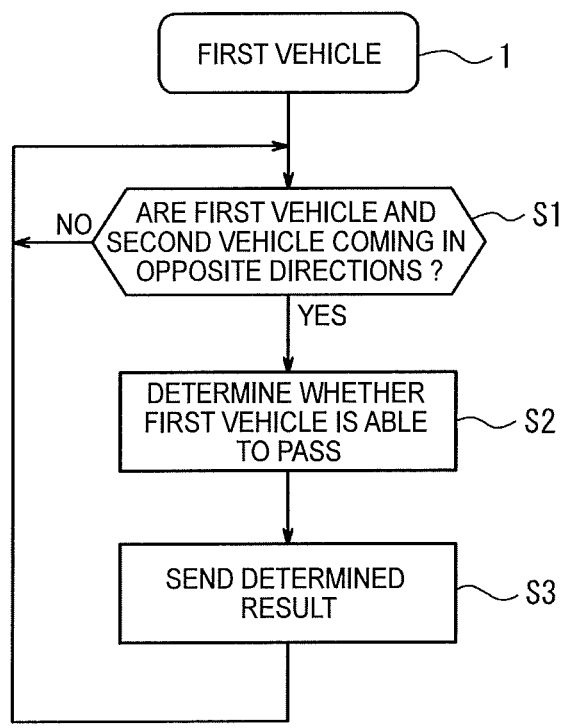
FIG. 7 is a flowchart of a process that the first vehicle executes.

FIG. 7 is a flowchart of a process that the first vehicle 1 executes.

In step S1, the first vehicle 1 determines whether the first vehicle 1 and the second vehicle 2 are coming in opposite directions.

In step S2, when the first vehicle 1 determines that the first vehicle 1 and the second vehicle 2 are coming in opposite directions (Yes in step S1), the first vehicle 1 determines whether the first vehicle 1 is able to pass. The determining method is as described above, so the description thereof will not be repeated.

In step S3, the first vehicle 1 sends a determined result to the second vehicle 2.

Figure 8:
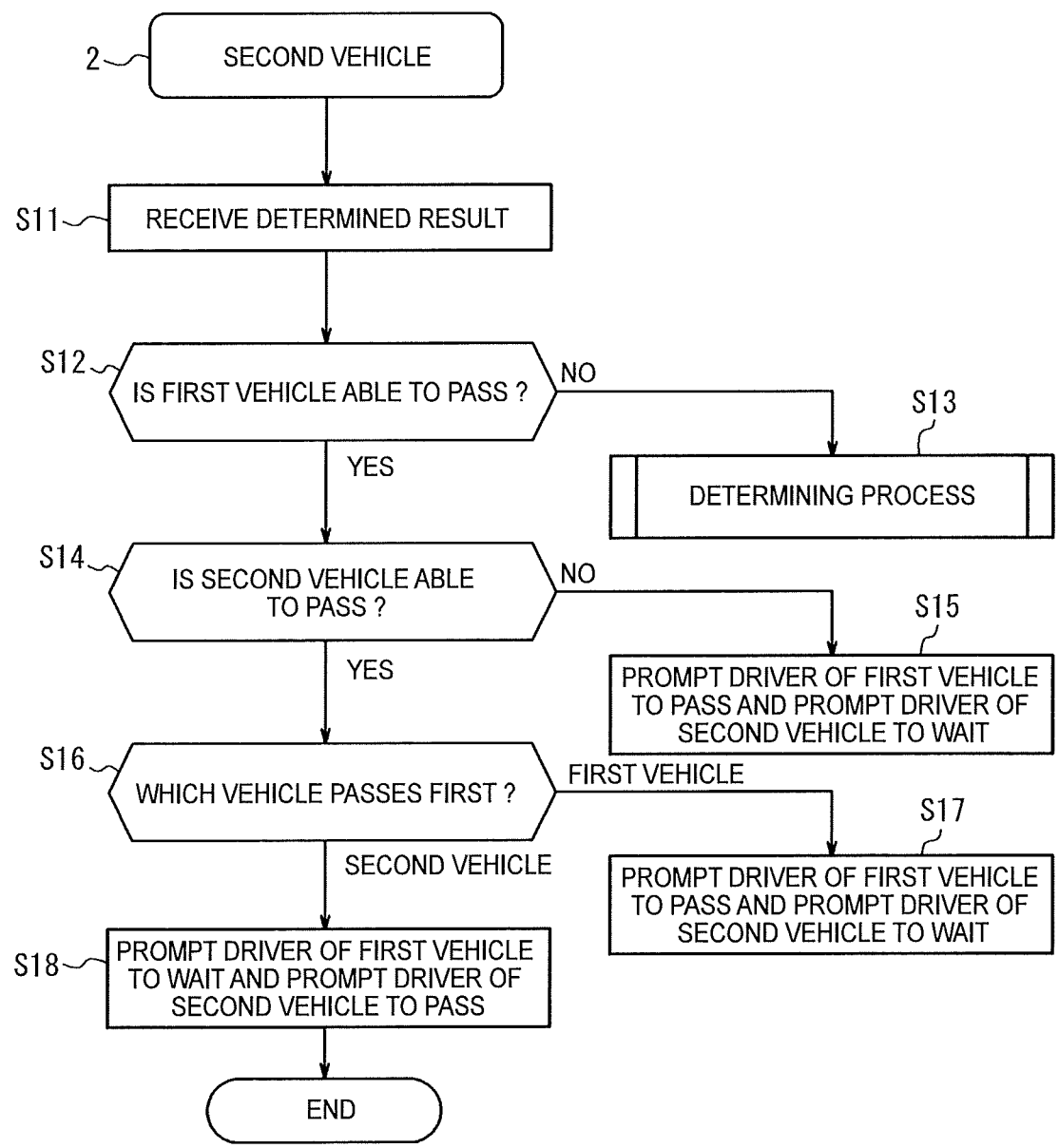
FIG. 8 is a flowchart of a process that the second vehicle executes.

FIG. 8 is a flowchart of a process that the second vehicle 2 executes.

In step S11, the second vehicle 2 receives the determined result from the first vehicle 1.

In step S12, the second vehicle 2 determines from the received determined result whether the first vehicle 1 is able to pass.

When the first vehicle 1 is not able to pass (No in step S12), the second vehicle 2 executes a determining process in step S13. The details of the determining process will be described later with reference to FIG. 9.

When the first vehicle 1 is able to pass (Yes in step S12, the second vehicle 2 determines in step S14 whether the second vehicle 2 is able to pass.

When the second vehicle 2 determines that the second vehicle 2 is not able to pass (No in step S14), the second vehicle 2 prompts the driver of the first vehicle 1 to pass and prompts the driver of the second vehicle 2 to wait in step S15.

When the second vehicle 2 determines that the second vehicle 2 is able to pass (Yes in step S14), the second vehicle 2 determines which one of the first vehicle 1 and the second vehicle 2 passes first in step S16.

When the second vehicle 2 determines that the first vehicle 1 passes first, the second vehicle 2 prompts the driver of the first vehicle 1 to pass and prompts the driver of the second vehicle 2 to wait in step S17.

When the second vehicle 2 determines that the second vehicle 2 passes first, the second vehicle 2 prompts the driver of the first vehicle 1 to wait and prompts the driver of the second vehicle 2 to pass in step S18.

Figure 9:
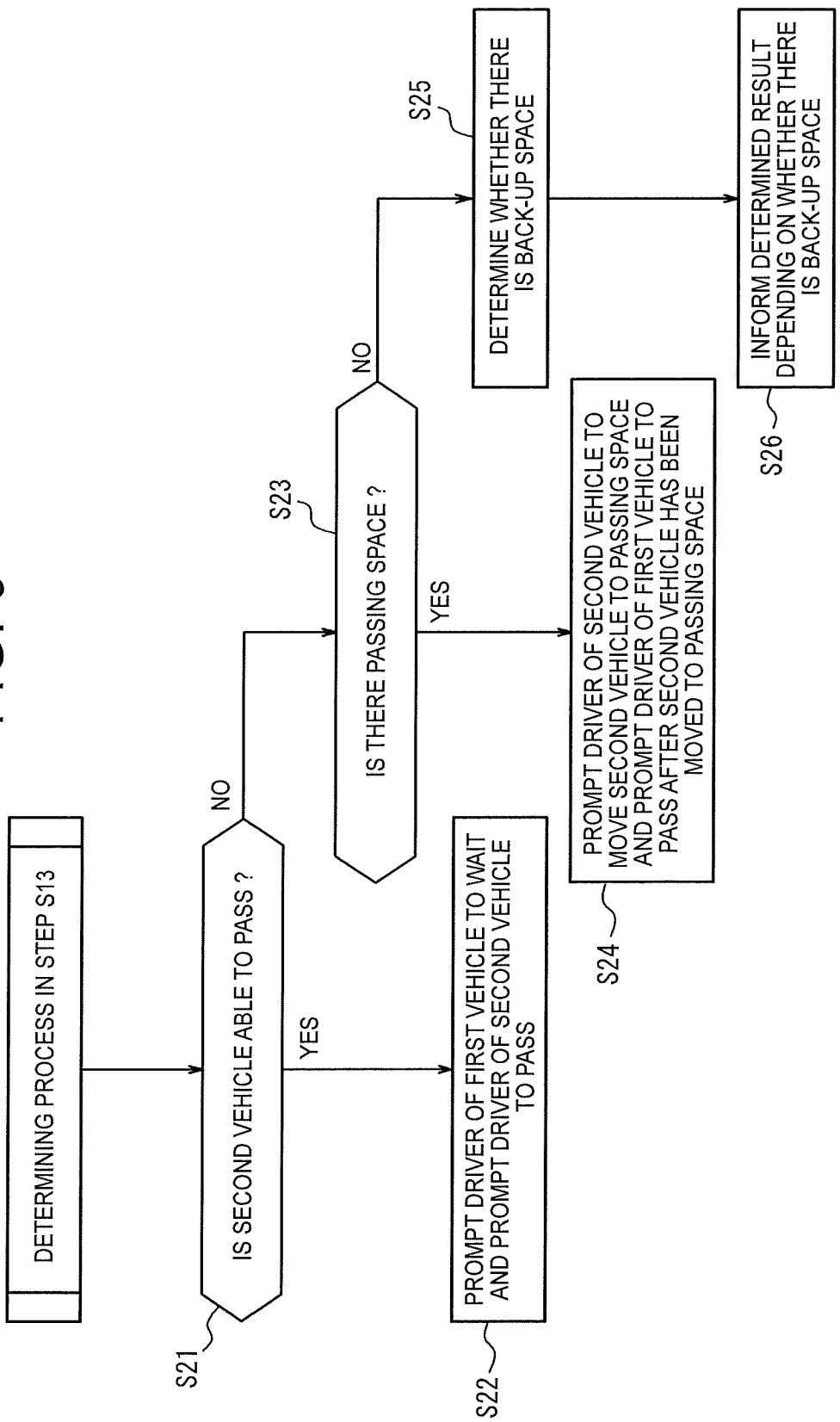
FIG. 9 is a flowchart of a determining process in FIG. 8.

FIG. 9 is a flowchart of the determining process of step S13 in FIG. 8.

In step S21, the second vehicle 2 determines whether the second vehicle 2 is able to pass.

When the second vehicle 2 determines that the second vehicle 2 is able to pass (Yes in step S21), the second vehicle 2 prompts the driver of the first vehicle 1 to wait and prompts the driver of the second vehicle 2 to pass in step S22.

When the second vehicle 2 determines that the second vehicle 2 is not able to pass (No in step S21), the second vehicle 2 determines in step S23 whether there is a passing space to the side of the second vehicle 2.

When the second vehicle 2 determines that there is a passing space, the second vehicle 2 prompts the driver of the second vehicle 2 to move the second vehicle 2 to the passing space and prompts the driver of the first vehicle 1 to pass after the second vehicle 2 has been moved to the passing space in step S24.

When the second vehicle 2 determines that there is no passing space (No in step S23), the second vehicle 2 determines in step S25 whether there is a back-up space behind the first vehicle 1.

In step S26, the second vehicle 2 informs a determined result depending on whether there is a back-up space. For example, when the second vehicle 2 determines that there is a back-up space behind the first vehicle 1, the second vehicle 2 prompts the driver of the first vehicle 1 to back up and prompts the driver of the second vehicle 2 to pass after the first vehicle 1 has been backed up. On the other hand, when the second vehicle 2 determines that there is no back-up space behind the first vehicle 1, and when the second vehicle 2 determines from the captured image behind the second vehicle 2 that there is a back-up space behind the second vehicle 2, the second vehicle 2 may prompt the driver of the second vehicle 2 to back up.

As described above, according to the present embodiment, the second vehicle 2 receives, from the oncoming first vehicle 1, a determined result that indicates whether the first vehicle 1 is able to pass, and determines whether the second vehicle 2 is able to pass based on the width of the second vehicle 2 and an available road width ahead, determined from the captured image. With this configuration, the second vehicle 2 is able to accurately determine the situations of both vehicles from determined results in both vehicles. Therefore, the first vehicle 1 and the second vehicle 2 are able to reduce a time loss and accidental contact due to drivers' giving way to each other, with the result that smooth road traffic can be provided.

According to the present embodiment, when the determined result indicates that the first vehicle 1 is not able to pass, and when the second vehicle 2 determines that the second vehicle 2 is able to pass, the second vehicle 2 prompts the driver of the first vehicle 1 to wait and prompts the driver of the second vehicle 2 to pass. With this configuration, the second vehicle 2 is able to clarify which vehicle passes first, with the result that smooth road traffic can be provided.

According to the present embodiment, when the determined result indicates that the first vehicle 1 is not able to pass, and when the second vehicle 2 determines that the second vehicle 2 is not able to pass, the second vehicle 2 determines based on the captured image whether there is a passing space to the side of the second vehicle 2. When the second vehicle 2 determines that there is a passing space, the second vehicle 2 prompts the driver of the second vehicle 2 to move the second vehicle 2 to the passing space and prompts the driver of the first vehicle 1 to pass after the second vehicle 2 has been moved to the passing space. With this configuration, even when it is temporarily determined that both the first vehicle 1 and the second vehicle 2 are not able to pass, the second vehicle 2 is enabled to pass by detecting a passing space, with the result that a stranded state can be resolved.

According to the present embodiment, when the second vehicle 2 determines that there is no passing space, the second vehicle 2 determines based on the captured image whether there is a back-up space behind the first vehicle 1, and, when the second vehicle 2 determines that there is a back-up space, prompts the driver of the first vehicle 1 to back up. With this configuration, the second vehicle 2 is able to ensure a space where the second vehicle 2 passes by causing the first vehicle 1 to back up, so further smooth road traffic can be provided.

According to the present embodiment, when the determined result indicates that the first vehicle 1 is able to pass, and when the second vehicle 2 determines that the second vehicle 2 is not able to pass, the second vehicle 2 prompts the driver of the second vehicle 2 to wait and prompts the driver of the first vehicle 1 to pass. With this configuration, the second vehicle 2 is able to clarify which vehicle passes first, with the result that smooth road traffic can be provided.

According to the present embodiment, when the determined result indicates that the first vehicle 1 is able to pass, and when the second vehicle 2 determines that the second vehicle 2 is able to pass, the second vehicle 2 determines from the captured image which vehicle passes first and informs a determined result to the driver of the first vehicle 1 and the driver of the second vehicle 2. With this configuration, the second vehicle 2 selects an appropriate vehicle and causes the selected vehicle to pass, so further smooth road traffic can be provided.

According to the present embodiment, when the determined result indicates that the first vehicle 1 is able to pass, and when the second vehicle 2 determines from the captured image that a beginner driver sign is stuck to any one of the first vehicle 1 and the second vehicle 2, the second vehicle 2 determines that the vehicle to which a beginner driver sign is stuck passes first and informs a determined result to the driver of the first vehicle 1 and the driver of the second vehicle 2. With this configuration, the second vehicle 2 is able to realize road traffic with considerations to beginners.

The disclosure is described based on the drawings and the embodiment; however, it should be noted that persons skilled in the art can easily make various modifications and corrections based on the disclosure. Therefore, it should be noted that the scope of the disclosure encompasses these modifications and corrections. For example, the functions, and the like, included in the devices, steps, or other components, may be rearranged without any logical contradiction, and a plurality of devices, steps, or other components, may be combined as one or may be divided.

For example, in the above-described embodiment, the second vehicle 2 receives a determined result as to whether the first vehicle 1 is able to pass, determines whether the host vehicle is able to pass, and then executes various determining processes (for example, which vehicle passes first, whether there is a passing space, and whether there is a back-up space). Alternatively, in another embodiment, when the second vehicle 2 determines whether the host vehicle is able to pass, the second vehicle 2 sends a determined result to the first vehicle 1. As a result, instead of the second vehicle 2, the first vehicle 1 executes all or part of the above-described various determining processes.

In the above-described embodiment, the first vehicle 1 and the second vehicle 2 perform vehicle-to-vehicle communication. On the other hand, in another embodiment, the first vehicle 1 and the second vehicle 2 may communicate via a server connected via a network. Whether the first vehicle 1 and the second vehicle 2 are coming in opposite directions is determined by the server based on the positional information of each of the vehicles. The communication unit 15 of the first vehicle 1 may include a communication module that connects with a network or a communication module that supports mobile communication standards, such as 4th generation (4G) and 5th generation (5G).

A configuration that a selected vehicle is made to function as the first vehicle 1 or the second vehicle 2 according to the above-described embodiment is possible. Specifically, a program that describes process details implementing the functions of the first vehicle 1 or the second vehicle 2 according to the embodiment is stored in a memory of the selected vehicle, and a processor of the selected vehicle reads the program and runs the program. Therefore, the disclosure according to the present embodiment may also be implemented as a processor-executable program.

What is claimed is:

1. A vehicle comprising:
a communication unit;
a storage unit;
a control unit; and
an image capturing unit, wherein:
the vehicle is configured to be communicable with a different vehicle via the communication unit, and
the control unit is configured to:
acquire a captured image from the image capturing unit and store the captured image in the storage unit,
receive, from the different vehicle that is an oncoming vehicle, a determined result indicating whether the different vehicle is able to pass, and
determine, from the captured image, whether the vehicle is able to pass based on a width of the vehicle and an available road width ahead of the vehicle, and
in response to a determination (i) that the determined result indicates that the different vehicle is not able to pass, and (ii) that the captured image indicates that the vehicle is able to pass, prompt a driver of the different vehicle to wait and prompt a driver of the vehicle to pass.

2. A vehicle comprising:
a communication unit
a storage unit
a control unit and
an image capturing unit, wherein:
the vehicle is configured to be communicable with a different vehicle via the communication unit, and
the control unit is configured to:
acquire a captured image from the image capturing unit and store the captured image in the storage unit,
receive, from the different vehicle that is an oncoming vehicle, a determined result indicating whether the different vehicle is able to pass, and
determine, from the captured image, whether the vehicle is able to pass based on a width of the vehicle and an available road width ahead of the vehicle, and
in response to a determination (i) that the determined result indicates that the different vehicle is not able to pass and (ii) that the captured image indicates that the vehicle is not able to pass, determine from the captured image whether a passing space exists to a side of the vehicle, and
in response to a determination that the passing space exists to the side of the vehicle, prompt a driver of the vehicle to move the vehicle to the passing space and prompt a driver of the different vehicle to pass after the vehicle has been moved to the passing space.

3. The vehicle according to claim 2, wherein the passing space includes at least one of a sidewalk and a turnout for vehicles.

4. The vehicle according to claim 2, wherein the control unit is further configured to:
in response to a determination that there is no passing space, determine from the captured image whether a back-up space exists behind the different vehicle, and
in response to a determination from the captured image that the back-up space exists, prompt the driver of the different vehicle to back up the different vehicle.

5. The vehicle according to claim 1, wherein, the control unit is further configured to:
in response to a determination (i) that the determined result indicates that the different vehicle is able to pass and (ii) that the captured image indicates that the vehicle is not able to pass, prompt the driver of the vehicle to wait and prompt the driver of the different vehicle to pass.

6. The vehicle according to claim 1, wherein, the control unit is further configured to:
in response to a determination (i) that determined result indicates that the different vehicle is able to pass and (ii) that the captured image indicates that the vehicle is able to pass, determine from the captured image which one of the vehicle and the different vehicle passes first, and
inform a determined result indicating which one of the vehicle and the different vehicle passes first, to the driver of the vehicle and the driver of the different vehicle.

7. The vehicle according to claim 1, wherein the control unit is further configured to:
in response to a determination (i) that the determined result indicates that the different vehicle is able to pass and (ii) that the captured image indicates (a) that the vehicle is able to pass and (b) that a beginner driver sign is stuck to any one of the vehicle and the different vehicle, determine that the vehicle to which the beginner driver sign is stuck passes first, and
inform a determined result to the driver of the vehicle and the driver of the different vehicle.

8. A vehicle control method for a vehicle including a communication unit, a storage unit, a control unit, and an image capturing unit, the vehicle being configured to be communicable with a different vehicle via the communication unit, the vehicle control method comprising:
acquiring a captured image from the image capturing unit;
storing the captured image in the storage unit;
receiving, from the different vehicle that is an oncoming vehicle, a determined result indicating whether the different vehicle is able to pass; and
determining, from the captured image, whether the vehicle is able to pass based on a width of the vehicle and an available road width ahead, of the vehicle; and
in response to a determination (i) that the determined result indicates that the different vehicle is not able to pass, and (ii) that the captured image indicates that the vehicle is able to pass, prompting a driver of the different vehicle to wait and prompting a driver of the vehicle to pass.

9. A non-transitory computer readable medium having instructions stored therein, which when executed by a control unit in a vehicle, that includes a communication unit, a storage unit, and an image capturing unit and that is configured to be communicable with a different vehicle via the communication unit, causes the vehicle to execute a method comprising:
acquiring a captured image from the image capturing unit;
storing the captured image in the storage unit;
receiving, from the different vehicle that is an oncoming vehicle, a determined result indicating whether the different vehicle is able to pass;
determining, from the captured image, whether the vehicle is able to pass based on a width of the vehicle and an available road width ahead of the vehicle; and
in response to a determination (i) that the determined result indicates that the different vehicle is not able to pass, and (ii) that the captured image indicates that the vehicle is able to pass, prompting a driver of the different vehicle to wait and prompting a driver of the vehicle to pass.

* * * * *